INVENTOR.
Robert F. Pfost
BY Flehr & Swain
ATTORNEYS

MAGNETIC TAPE APPARATUS

Filed Dec. 13, 1955 3 Sheets-Sheet 2

INVENTOR.
Robert F. Pfost

BY Flehr and Swain

ATTORNEYS

Nov. 10, 1959 R. F. PFOST 2,912,517

MAGNETIC TAPE APPARATUS

Filed Dec. 13, 1955 3 Sheets-Sheet 3

INVENTOR.
Robert F. Pfost

BY Flehr & Swain

ATTORNEYS

United States Patent Office 2,912,517

Patented Nov. 10, 1959

2,912,517

MAGNETIC TAPE APPARATUS

Robert Fred Pfost, Mountain View, Calif., assignor to Ampex Corporation, Redwood City, Calif., a corporation of California Application December 13, 1955, Serial No. 552,867

2 Claims. (Cl. 179—100.2)

This invention relates generally to electromagnetic tape apparatus, and particularly to apparatus for use in systems for recording and/or reproducing signal intelligence over a wide frequency spectrum, including for example, video frequencies.

In copending application Serial No. 524,004, filed July 25, 1955, for "Broad Band Magnetic Tape System and Method" there is disclosed a system making use of a rotary head assembly for recording and/or reproducing signals over a wide frequency spectrum. One practical use for such a system is the recording and reproduction of television programs. The head assembly employed comprises a plurality of transducer units that are mounted to rotate and to sweep transversely across a magnetic tape. Special speed control means is employed for driving the head assembly and the magnetic tape during recording, and to insure accurate tracking and synchronization for playback operations. The rotary head assembly and the transducer units are an important part of the complete system, and must be made with a high degree of precision to prevent distortion. Also the transducer units should be capable of continuous operation over long periods of time without undue wear, and with relatively efficient translation of the record tracks into electrical current variations.

In general it is an object of the present invention to provide an improved rotary head assembly suitable for use in systems of the character described above.

Another object of the invention is to provide a head assembly of the above character which can be readily manufactured to a high degree of precision.

Another object of the invention is to provide a head assembly of the above character which will facilitate the use of tips made of wear-resisting magnetic material, and which will have effective pickup efficiency for relatively high frequencies, as for example frequencies of the order of 4 megacycles or higher.

Additional objects and features of the invention will appear from the following description in which the preferred embodiments have been set forth in detail in conjunction with the accompanying drawing.

Referring to the drawing.

Figure 1:
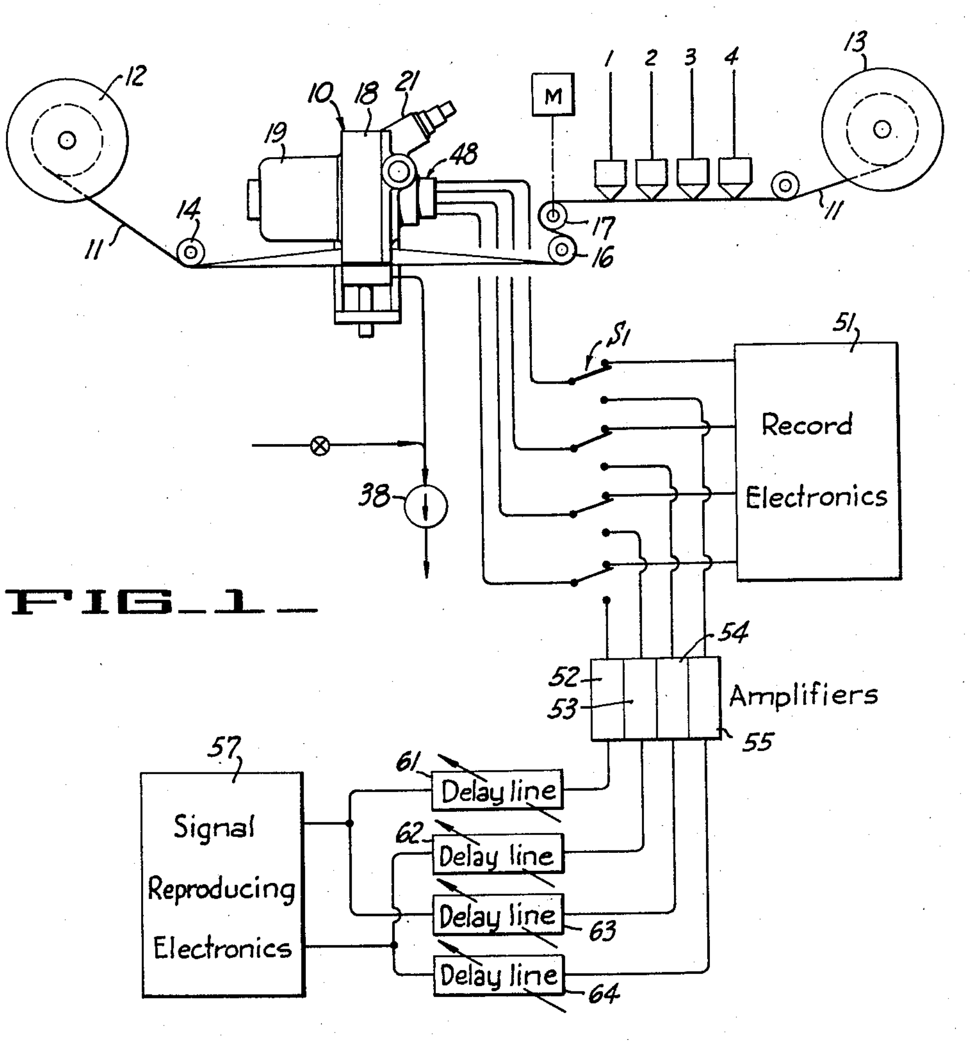
Figure 1 is a plan view schematically illustrating a system and apparatus for recording and/or reproducing signal intelligence over a wide frequency spectrum.

The apparatus 10 incorporated in the system of Figure 1 employs a plurality of transducer units that are caused to sweep successively across a magnetic tape, as the tape 11 is being moved by transport means in the direction of its length. Preferably the sweep paths of the units are rectilinear, and a portion of the tape is cupped or curved to conform to the surface of a cylinder in the region where it is being contacted by the units. The transport means schematically illustrated in Figure 1 includes conventional supply and takeup reels 12 and 13, carried by suitable turntables. In accordance with customary practice a suitable motor is provided for the turntable 12 for applying a torque to maintain constant tape tension during recording or playback. Also this motor can be energized for rewind operations. Another motor is also associated with the turntable for reel 13, to apply constant tension for tape takeup. Guide studs or rollers 14 and 16, which are preferably flanged, are disposed to engage the tape at spaced distances from the operating end of the head assembly. The tape also engages a driving capstan 17, and as disclosed in said copending application, it may engage a number of additional stationary magnetic heads 1, 2, 3 and 4, for operating upon side margins of the tape. The tape employed is of substantial width compared to tape used with conventional magnetic equipment, and for example may have a width of the order of two inches. Its construction can be similar to magnetic tape now available on the market for sound recording, and it can consist of a pliable strip of plastic material having a thin coating of magnetic material on one side of the same.

The head assembly 18 is driven by an electric motor 19. Pulse generating means 21 can be associated with the head assembly to generate pulses having a frequency dependent upon the speed of rotation. As disclosed in said copending application the pulses thus generated can be used in conjunction with speed control means for controlling the speed of the motor M for the capstan 17, and the head motor 19. Also as disclosed in said copending application, such pulses can be used for electronic switching operations during reproduction.

Figures 2, 3:
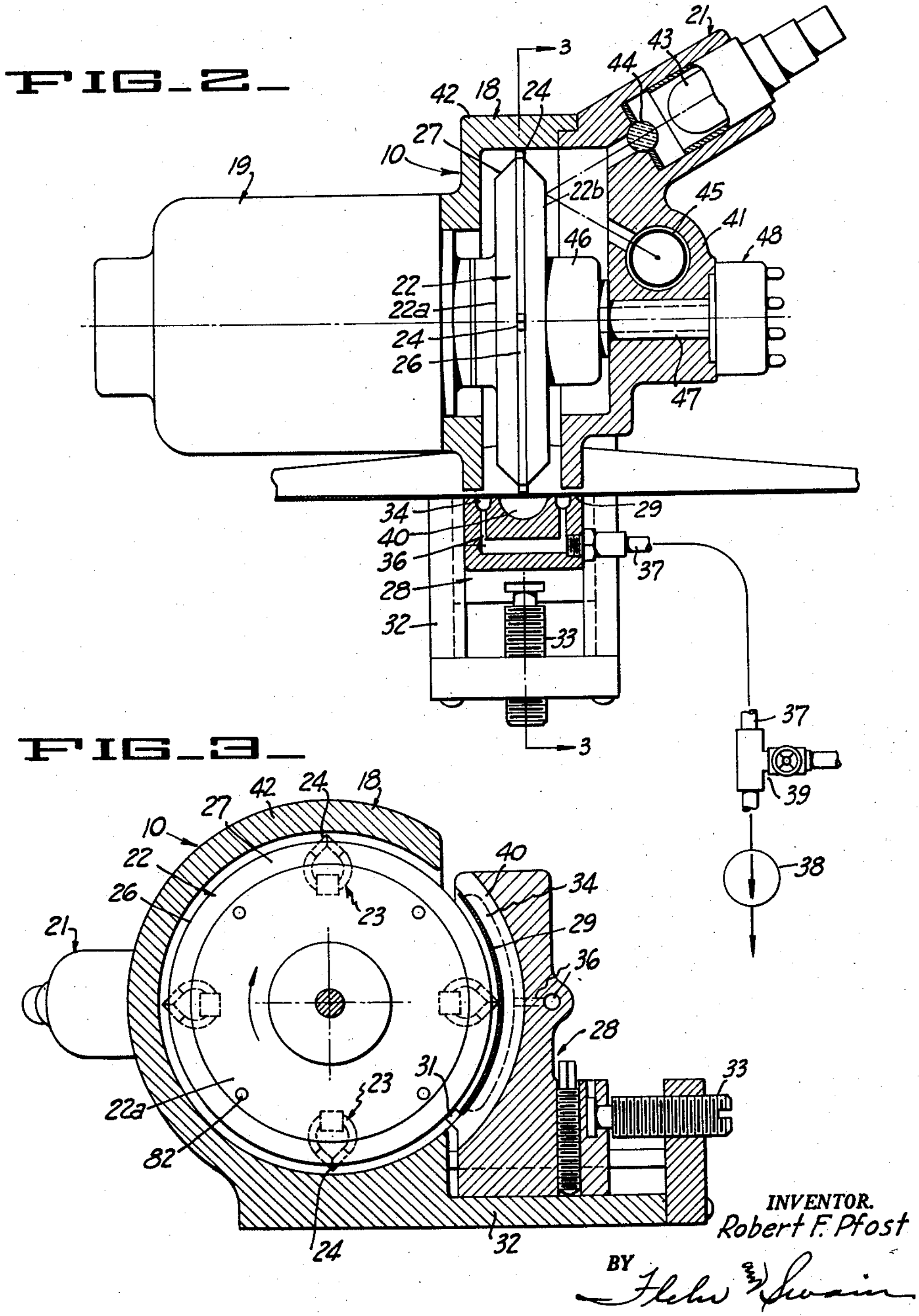
Figure 2 is a plan view of the operating head incorporated in Figure 1, certain parts being in section.
Figure 3 is a cross-sectional view taken along the lines 3—3 of Figure 2.

As shown particularly in Figures 2 and 3, the head assembly consists of a wheel-like structure 22 directly mounted upon the shaft of motor 19, and which carries a plurality of transducer units 23. These units are of special construction and are mounted in a particular manner, as will be presently explained.

Adjacent one side of the wheel 22 there is a tape retaining or holding means 28 that holds the tape in the desired cupped condition and presents it for contact with the tips of the transducer units. As viewed in Figure 3, the holder 28 has a tape engaging surface 29 formed on an arc of a circle having the axis of the motor shaft as its center. One or more stops or shoulders 31 are provided for engaging one edge of the tape. The holder can be mounted upon a guideway 32 provided with means such as the adjusting screw 33, whereby it may be set in proper alined position relative to the motor shaft. Preferably pneumatic means is employed to insure constant contact of the tape with the curved surface 29. Thus grooves 34 are provided which may terminate short of the upper and lower edges of the arcuate surfaces 29, and which are shown connected by ducts 36 with the tube 37. This tube is connected to a source of vacuum, represented by the vacuum pump 38. Preferably the vacuum is adjustable, and this can be accomplished by providing an adjustable bleed-in valve 39, connected with the line 37.

Figure 1A:
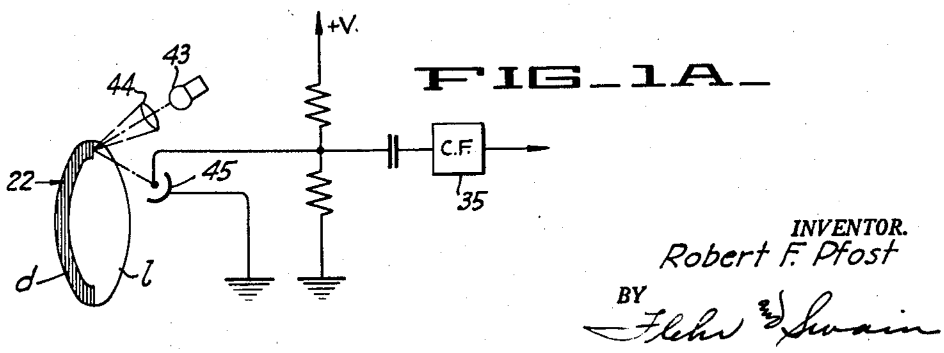
Figure 1A is a circuit diagram schematically illustrating a pulse generator.

The pulse generating means can be constructed as shown in Figure 2. In this instance the mounting 41 is provided, which in conjunction with the housing part 42, forms a shroud or housing for the wheel 22. A source of light, such as the electric lamp 43, is focused by lens 44 upon one side of the wheel 22. Light reflected from the wheel is received by the photoelectric tube 45. As shown in Figure 1A, one segment *d* of the wheel is darkened, and another segment 1 made light reflecting. Figure 1A also illustrates the photoelectric tube being coupled to the cathode follower 35, the output from which can be applied to a motor control system as disclosed in said copending application.

Figure 2 illustrates how the magnetic tape 11 is cupped as it moves past the wheel 22 and in contact with the curved surface 29 of the holder. The holder is recessed or cut away as indicated at 40, for the entire length of the arcuate surface 29, whereby that portion of the tape spanning this recess is contacted by the tips of the transducer units. Normally the contact is with sufficient pressure to slightly stretch and indent the tape in the limited localized region being contacted by the tip.

Suitable means are provided to facilitate making external connections with the several transducer units. Thus suitable slip ring means can be provided within the wheel hub 46, and leads from the same are taken out through the tube 47 to the terminal block 48. One side of each transducer unit can be grounded, and the other side connected to slip ring means which in turn connects with an individual lead for external connection.

In Figure 1 the tabs of terminal block 48 are shown connected to the change over switch S1, which has one set of its contacts connected with the record electronics 51. In a typical instance this can consist of means for producing a modulated carrier together with suitable record amplifiers. The other set of contacts of switch S1 connect with playback electronics, which can consist of preamplifiers 52, 53, 54 and 55, together with signal reproducing electronics 57. Where a carrier frequency is amplitude modulated by the signals, and the A-M carrier recorded, the electronics 57 can consist of conventional demodulating means and signal amplifiers. Where F-M recording is employed, this electronics can consist of detecting means of the discriminator type and signal amplifiers. As disclosed in said copending application reproduction can be controlled by switching whereby only a predetermined length of each record track is employed for reproduction, and the outputs of the heads which successively sweep the tape combined to make the output. Such switching can be controlled by pulses derived from the pulse generating means.

As further disclosed in copending application filed simultaneously herewith in the names of Charles P. Ginsburg, Shelby F. Henderson, Jr., Ray M. Dolby and Charles E. Anderson, and entitled "Magnetic Tape System and Method" Serial No. 552,868 filed December 13, 1955, variable delay lines 61, 62, 63 and 64 can be interposed between the amplifiers 52—55 and the electronics 57.

Figures 4, 5, 6, 7, 8, 9, 10, 11, 12:
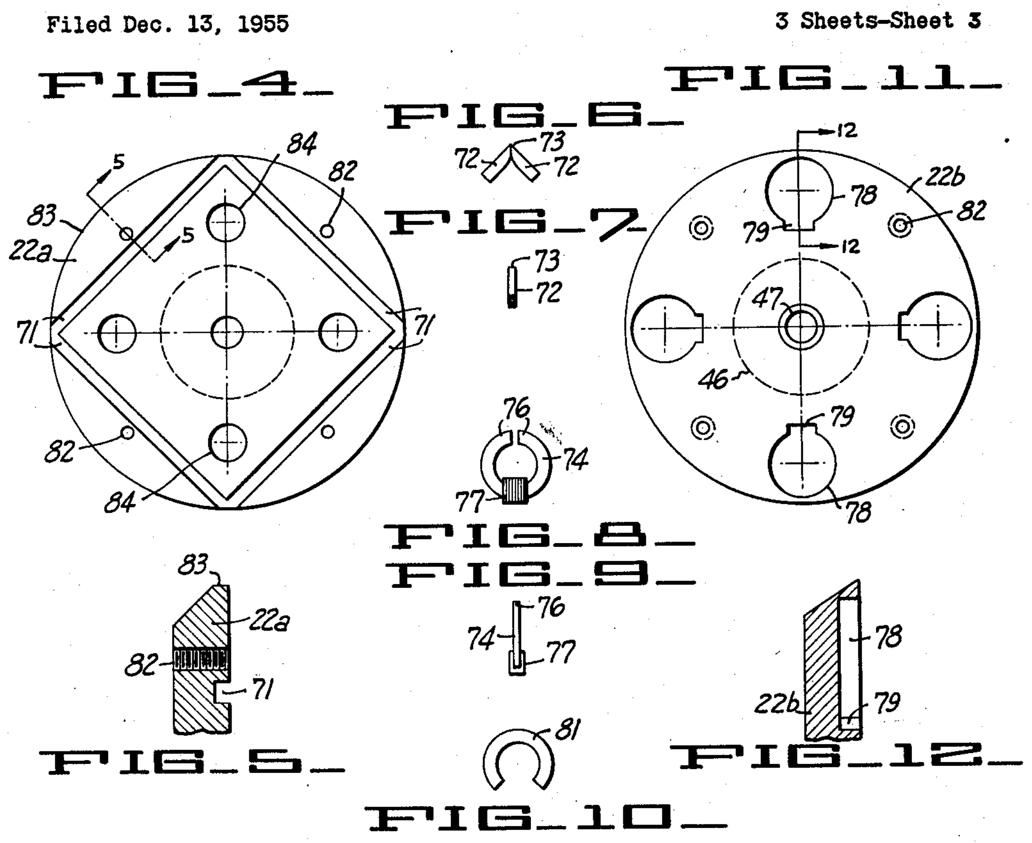
Figure 4 is a side view of one part of the rotary structure incorporated in Figure 2.
Figure 5 is a cross-sectional detail taken along the line 5—5 of Figure 4.
Figure 6 is a side view of two pole pieces such as are used to form a part of the transducer.
Figure 7 is an end view of the pole pieces shown in Figure 6.
Figure 8 is a side view showing the magnetic core and winding for one of the transducer units.
Figure 9 is an end view of the transducer unit shown in Figure 8.
Figure 10 is a side view showing a resilient pad or gasket used with the transducer unit.
Figure 11 is a side view showing another part of the rotary structure, which is used in conjunction with the part shown in Figure 4.
Figure 12 is a cross-sectional view taken along the line 12—12 of Figure 11.
Figure 13:
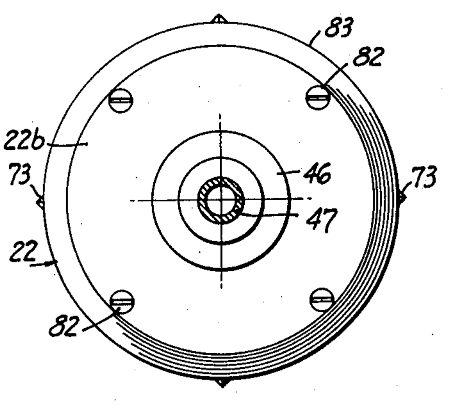
Figure 13 is a side view showing a complete rotary structure with the transducer units.
Figure 14:
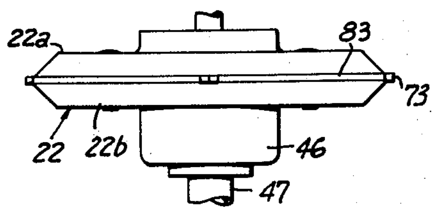
Figure 14 is a view looking towards one edge of the structure shown in Figure 13.

Figures 4 to 16, inclusive, illustrate the preferred construction for the wheel 22, and the transducer units associated with the same. Thus a wheel is formed of two annular parts 22*a*, 22*b*, which can be formed of metal of suitable strength, such Dural or other suitable light weight alloy. Grooves 71 are formed on the inter-face of the part 22*a*, and assuming that four transducer units are employed, there are four of these grooves and they extend at right angles to each other. The ends of these grooves intersect on the periphery of the part 22*a*. Each transducer unit includes a pair of pole members 72 (Figures 6 and 7) which can be rectangular in section, and which are disposed in the form of a V. The adjacent ends that form the apex or tip 73 are beveled off to form adjacent opposed end faces, and these end faces are maintained separated a slight distance by means of a suitable nonmagnetic metal shim or other thin layer of nonmagnetic material. The pole members 72 are dimensioned to fit snugly within the grooves 71, with their tip ends projecting beyond the periphery of the wheel.

Each transducer unit also includes a magnetic core 74 of laminated construction, which can be horseshoe or ring shaped as illustrated. The two side branches of this core have their ends 76 separated by a nonmagnetic gap, which is relatively large compared to the gap between the pole members 72. A suitable coil or winding 77 is also applied about the core 74.

The wheel part 22*b* is provided with a plurality of recesses 78 each contoured to receive a magnetic core 74. Thus assuming that each magnetic core is circularly contoured, each recess 78 is likewise circular. An additional cutaway 79 can be provided to accommodate the winding 77. A pad or gasket 81 of resilient material, such as natural or synthetic resilient rubber, is shaped whereby it may be fitted in the recess 78, to underlie the magnetic core 74.

Figure 15:
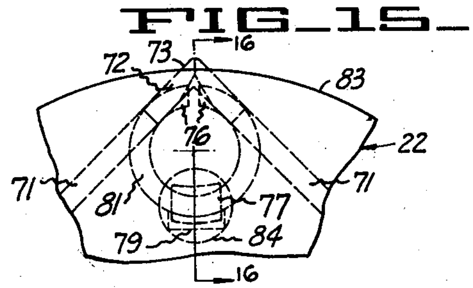
Figure 15 is an enlarged detail of one portion of the rotary structure, and illustrating one transducer unit.
Figure 16:
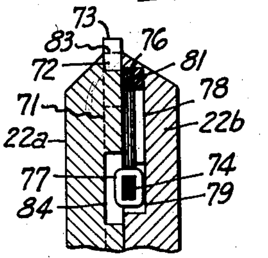
Figure 16 is a cross-sectional detail on an enlarged scale taken along the line 16—16 of Figure 15.

The parts illustrated in Figures 4 to 12, inclusive, are assembled as follows: The several pairs of pole members 72 are first seated within the grooves 71, with the tips 73 projecting from the periphery of the wheel part 22*a*, and with the nonmagnetic shims positioned between the adjacent end faces. The gaskets or cushions 81 are placed within the recess 78 of part 22*b*, and then the cores 74 inserted in the recesses 78, upon top of the gaskets. The two assemblies thus made are placed against each other and clamped together by suitable means, such as screws 82. The positioning of the transducer parts in the completed assembly is shown in Figures 15 and 16. Note that the tip 73 of each transducer formed by the adjacent ends of the pole members 72, project a short distance from the wheel periphery 83. The magnetic core 74 has its two branches pressed in close physical contact with the adjacent sides of the pole members 72, and this clamping relationship is maintained by compression by the gasket or cushion 81. Each winding 77 is accommodated in the recess extension 79 and the recesses 84 which are shown formed in the inner face of the wheel part 22*a*. As previously mentioned one terminal of each winding 77 can be grounded and the other lead extended to the hub 46, and to the slip ring means housed within the same.

After completing the assembly the wheel can be balanced by known static and dynamic methods to permit it to operate at speeds of the order of from 120 to 360 r.p.m., without vibration. Likewise the tips 73 of the transducer units can be accurately machined by grinding and lapping to provide proper surfaces for contact with the tape, and to have these surfaces at precisely identical distances from the center of rotation.

When the apparatus described above is used for recording, the tape is fed at a constant speed across the holder 28, and is maintained cupped in the manner illustrated in Figures 2 and 3. The wheel is driven at a constant speed which for example may be of the order of from 120 to 360 r.p.m., for wheels ranging from 2 to 1 inches in diameter. The tips of the transducer units sweep across the tape, while the tape is being fed at a predetermined speed by the capstan 17. As a result successive record tracks are made across the tape, the tracks being spaced a short distance in the direction of the length of the tape. For reproduction the tape is again fed in the manner previously described and the motor 19 driven at a controlled speed to insure synchronization and tracking. The transducer units sweep across the record tracks and the resulting current variations applied to the reproducing electronics. The delay lines 61—64 can be individually adjusted for the purpose of compensating for slight differences between the angular spacing between the transducer units of the reproducing equipment, and the angular spacing of the units used for recording. Likewise the vacuum applied to the holder 28 can be adjusted, as by adjusting the bleed valve 39, to vary the contact pressure between each transducer tip and the tape. Such an adjustment serves to compensate for slight differences between the sweep radius of the recording head assembly, and the sweep radius of the tips of the transducer units used for reproduction. Such differences may occur due to differences in manufacture, or because of wear of the transducer tips during usage. The foregoing compensating adjustments are disclosed in said copending application filed simultaneously herewith.

The construction of the wheel 22 and the several transducer units has a number of advantageous features. The manner in which the pole members 72 are seated within the grooves 71 facilitates accurate angular positioning of the tips and the nonmagnetic gaps, during assembly and manufacture. Furthermore after an assembly is made the pole pieces are held firmly against displacement when operating at relatively high speeds of rotation. The cores 74 for the windings 77, are held in efficient magnetic relation with the pole members, due to the manner in which the parts are clamped together in side by side relationship. Furthermore this construction makes it possible to utilize pole members made of relatively hard wear-resisting metal, metal alloy, or other magnetic material, whereas the cores can be made of softer laminations having good magnetic permeability.

I claim:

1. In magnetic tape apparatus, a mounting structure having an outer periphery and adapted for axial rotation, a pair of pole members of magnetic material, the structure having a pair of recesses proportioned to snugly accommodate said members, said members being disposed in the form of a V with the apex of the V being adjacent said periphery whereby the adjacent ends form pole tips at said periphery for contacting a magnetic tape, a thin layer of nonmagnetic material disposed between the outer ends of each pair of pole members, a separate core ring formed of magnetic material and providing two magnetic branches with the polar ends of the same spaced apart, a winding upon said magnetic core, such structure being formed to provide another recess adapted to accommodate and retain said magnetic core and winding, said last named recess being offset from the general plane of the first named recesses but in juxtaposition therewith, the offset being in the direction of the axis of rotation of the structure, the corresponding sides of said core branches being in contact with corresponding sides of said pole members with the surfaces in contact being in a common plane, and means for urging the branches of each of said magnetic cores into physical contact with the adjacent side surfaces of the pole members.

2. Apparatus as in claim 1 in which both said pole members, and said first named recesses for accommodating the same, are rectangular in section, and substantially rectilinear in length.

References Cited in the file of this patent

UNITED STATES PATENTS

| | | |
|---|---|---|
| 2,245,286 | Marzocchi | June 10, 1914 |
| 2,263,485 | Clopton | Nov. 18, 1941 |
| 2,352,023 | Schuller | June 20, 1944 |
| 2,592,652 | Buhrendorf | Apr. 15, 1952 |
| 2,648,589 | Hickman | Aug. 11, 1953 |
| 2,743,318 | DeForest | Apr. 24, 1956 |
| 2,750,449 | Thompson | June 12, 1956 |
| 2,762,861 | Somers | Sept. 11, 1956 |
| 2,813,924 | Coutant et al. | Nov. 19, 1957 |

FOREIGN PATENTS

| | | |
|---|---|---|
| 1,013,286 | France | Apr. 30, 1952 |
| 737,323 | Great Britain | Sept. 21, 1955 |